Oct. 3, 1967

P. VERSLUYS ET AL 3,345,046

GAS-LIQUID CONTACTOR

Filed Oct. 22, 1964

INVENTORS:
PAULUS VERSLUYS
WILLEM C. VAN 'T SANT
FRANCOIS A. H. GILISSEN
WILLEM H. MANGER

BY:

THEIR ATTORNEY

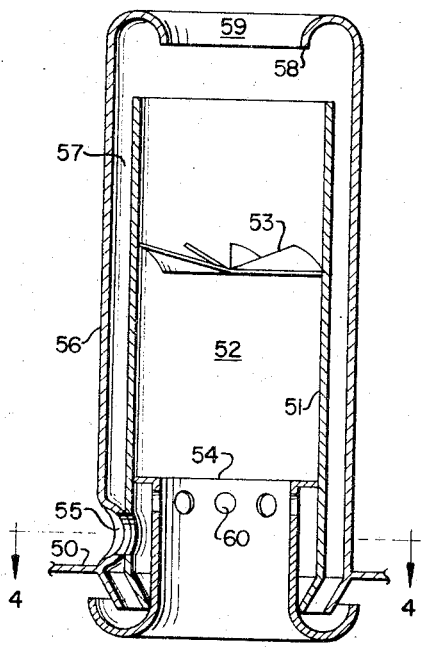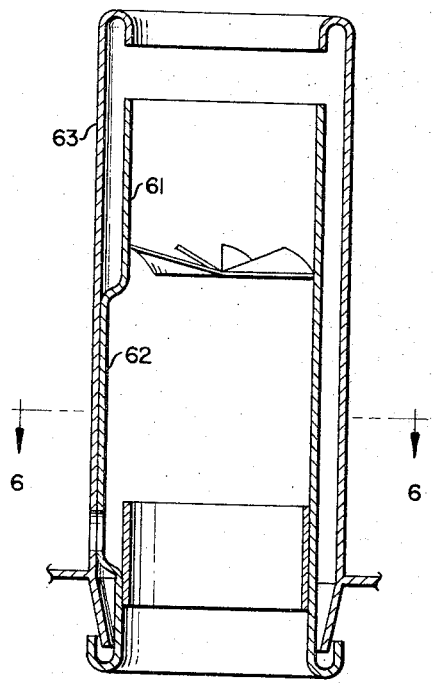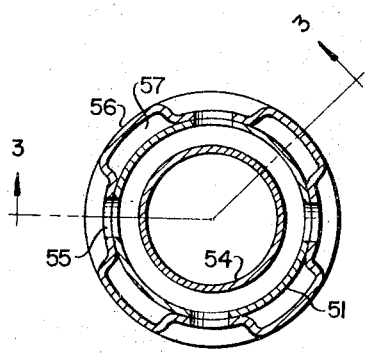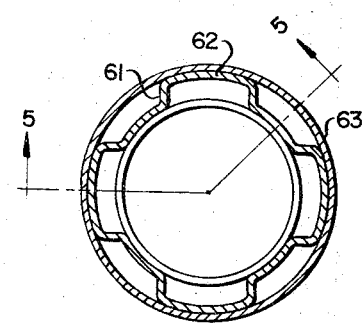

Oct. 3, 1967  P. VERSLUYS ETAL  3,345,046
GAS-LIQUID CONTACTOR
Filed Oct. 22, 1964  3 Sheets-Sheet 3

INVENTORS:
PAULUS VERSLUYS
WILLEM C. VAN 'T SANT
FRANCOIS A. H. GILISSEN
WILLEM H. MANGER
BY: *Oswald H. Milmore*
THEIR ATTORNEY

United States Patent Office 3,345,046
Patented Oct. 3, 1967

3,345,046
GAS-LIQUID CONTACTOR
Paulus Versluys and Willem C. van 't Sant, The Hague, and Francois A. H. Gilissen and Willem H. Manger, Amsterdam, Netherlands, assignors to Shell Oil Company, New York, N.Y., a corporation of Delaware
Filed Oct. 22, 1964, Ser. No. 405,695
Claims priority, application Netherlands, Oct. 30, 1963, 299,912
6 Claims. (Cl. 261—79)

This invention relates to apparatus for contacting liquids and gases, which apparatus comprises a contacting chamber enclosed by a tubular wall through which the gas and liquid move concurrently in an upward or downward direction, the said chamber having gas and liquid inlets at one end and gas and liquid outlets at the other. Several contacting units of such construction can be combined to effect an over-all countercurrent flow between the liquid and gas.

The term "gas" is herein used generically to include vapor.

In industry, as, for instance, in distilling in oil refineries, very large quantities are often involved in the gas-liquid exchange processes. In these cases the use of tubular contacting apparatuses as described above is very attractive, because high gas rates can be applied. In relation to the design of a plant of this type it is of great importance to aim at a minimum volume of the entire plant, because the cost of construction very much increases with increasing volume of the plant, mainly as a result of the heavier column and foundation required. It is well understood by those skilled in the art that to attain a given separating efficiency the length of the tubular chamber of a large diameter will have to be longer than length of a tubular chamber of a small diameter. Owing to this it is desirable to make use of a plurality of tubular contacting apparatuses of small diameter rather than of a single contacting apparatus of a large diameter. If, now, a plurality of small tubular chambers are placed next to each other on a tray, the same quantity of product of the desired quality may be produced at a much smaller height than would be possible through the use of a single tubular chamber of much larger diameter.

In this connection it is important to put the tubular chambers on the tray as near as possible to each other. This makes special demands on the construction of the means for supply and discharge of liquid for each tubular chamber. These means for supply and discharge should preferably make it possible for two or more trays to be placed above each other because generally, for example in distillation, the process of exchange must take place in several steps to enable the desired separation to be reached. This invention provides the means by which these requirements can be met in a simple way.

Broadly, the invention comprises a gas-liquid contacting device wherein each tubular contacting apparatus is provided with an outer enveloping tubular wall; the space between the two tubular walls being untilized for the discharge of liquid. On the discharge end of the tubular contacting apparatus the liquid that has been separated from the gas flow is caught on all sides and passed into the space between the two tubular walls. The width of the shell-shaped space between the two tubular walls can be adapted to the quantity of liquid to be processed.

It is advantageous for the enveloping tubular wall on the discharge end of the contacting apparatus to be longer than the tubular wall of the contacting apparatus per se; the protruding terminal end portion of the enveloping tubular wall being bent inwardly in such a manner that the smallest diameter of the bent portion is equal to or smaller than the diameter of the contacting tubular wall. As a result, the liquid to be discharged, due to rotary motion given to the gas, moves in all directions over the brim on the discharge end of the contacting apparatus and is caught by the enveloping tubular chamber. Consequently, there is no need of other means for catching the liquid.

The liquid being passed downwardly in the shell-shaped space of a contacting apparatus must remain separated from the liquid to be supplied to that contacting apparatus. This can be achieved in a simple manner by providing for the shell-shaped space to extend at least as far as the underside of the tray on which the tubular chamber in question is placed. In this connection it is advantageous for the space between the tubular contacting apparatus and the enveloping tubular wall on the supply end of the contacting apparatus to discharge into an annular drain which is located under the tray and through which drain the liquid discharge can be passed to a space located below the tray.

In order to prevent undesired effects resulting from a pressure difference between the two sides of the tray such as, for instance, irregular discharge of liquid, it is, in addition, advantageous to construct the annular drain in such a manner that a liquid seal is provided.

Furthermore, for reasons of construction it is attractive if near the tray there are one or more connections between the space outside the enveloping tubular wall and the tubular contacting apparatus for the supply of liquid to the chamber located inside the tubular contacting apparatus. In such a case the liquid to be supplied can be passed freely over the tray. Such a connection may consist of a pipe. Alternatively, the connection may be obtained by providing for the walls of the two tubular members to touch at the location of each connection either by extrusion of the wall of the contacting apparatus and/or by indentation of the enveloping tubular wall; the connection being provided by an aperture in the tangent plane. This method is advantageous particularly in cases where it is desired to mass produce contacting apparatus of this type.

With the enveloping tubular wall according to the invention, which may, or may not, be provided with the above-mentioned complementary improvements, mounting of a plurality of tubular contacting apparatuses on a tray so that they are very close together is possible due to the fact that it has been possible to obtain complete, or almost complete, axial symmetry of the contacting apparatuses with means of supply and discharge. Still, if a small capacity is required, the use of a tray with only one contacting apparatus of this type is attractive in view of its simple construction.

The space between the enveloping tubular wall and the tubular contacting apparatus which is available for the discharge of liquid will not always be entirely utilized for this purpose. Part of that space may then serve for local enlargement of the cross-sectional area of the tubular contacting apparatus, mainly by extrusions of the wall of the tubular contacting apparatus within the space between that contacting apparatus and the enveloping tubular wall. These extrusions may, for instance, run parallel to the axis of the tubular chamber. In this way the capacity of the contacting chamber may be increased.

The tubular contacting apparatuses can be constructed, for example, by soldering, welding, bolting or riveting, and use can be made of such manufacturing procedures as punching, extrusion, deep drawing, casting and injection molding.

Consequently, with trays provided with one or more tubular contacting apparatuses having enveloping tubular walls according to the invention it is possible for a column consisting of two or more trays placed above each other inside an enveloping wall to be built up in a simple manner. In this connection it is advantageous to locate the tubular contacting apparatuses in corresponding positions on each tray so that said apparatuses are in substantial vertical alignment with each other. As a result, the liquid discharged from one contacting apparatus can fall into the liquid inlet of another contacting apparatus placed below it. In addition, as a result of such construction it is possible for the gas leaving one contacting apparatus to reach another contacting apparatus placed above it with minimum resistance.

The invention will now be described with reference to the accompanying drawings wherein:

FIGURE 3 is a longitudinal section showing a modified embodiment of a tubular contacting apparatus according to the invention, taken on the line 3—3 of FIGURE 4;

FIGURE 4 is a cross-sectional view taken on the line 4—4 of FIGURE 3;

FIGURE 5 is a longitudinal section showing another modified embodiment of a tubular contacting apparatus according to the invention taken on the line 5—5 of FIGURE 6;

FIGURE 6 is a cross-sectional view taken on the line 6—6 of FIGURE 5; and,

Figure 1:
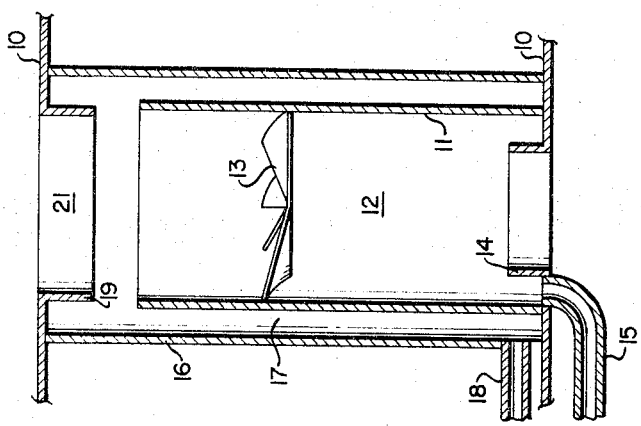
FIGURE 1 is a longitudinal section of a tubular contacting apparatus, placed on a tray and provided with an enveloping tubular wall according to the invention.

Referring to FIGURE 1 there is shown a tray 10 having mounted thereon a first elongated tubular wall 11 which defines a contacting chamber 12 having located therein a vane deck 13. Gas enters the chamber 12 through the opening 14 and liquid enters the chamber through the conduit 15. Between the vane deck 13 and the opening 14 there may be provided means (not shown) for atomizing the liquid, for instance a vane deck or obstacles on the tubular wall. A second elongated tubular wall 16 is concentrically positioned outside the first tubular wall 11 in such a manner that a space 17 is defined between the two walls as shown. A conduit 18 is provided near the bottom of second tubular wall 16 to allow separated liquid to leave the space 17. An annular collar 19 is located above the tubular walls 11 and 16. Collar 19 is of slightly smaller diameter than first tubular wall 11 and defines an opening 21 permitting gas to leave the apparatus by upward flow.

During operation, liquid admitted from the distribution conduit 15 passes into the chamber 12 and is carried along the tubular wall 11 by a gas stream which ascends through the opening 14 from any source, such as the next lower unit. As the liquid encounters the gas, liquid droplets are formed via gas entrainment and any liquid coalescing on the wall 11 is re-entrained in the gas. Thus, a sweeping and dispersal action is created within chamber 12 owing to the gas velocity. As the gas flows through the vane deck 13 it is given a rotary motion about the vertical axis of the contacting chamber 12. This sets up centrifugal forces whereby the dispersed liquid droplets are flung outwardly to the wall 11, while being swept upward by the gas. The gas, largely denuded of liquid, escapes through the opening 21 while the liquid moves outwardly over the brim of the tubular wall 11 where it is first caught between collar 19 and wall 16 and then drops downwardly through the space 17 after which it is carried away through conduit 18.

Figure 2:
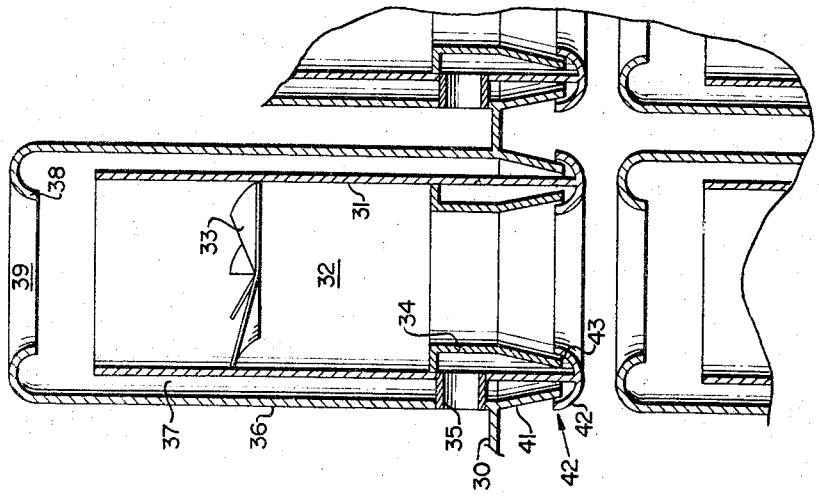
FIGURE 2 is a longitudinal section showing a modified embodiment of a similar tubular contacting apparatus and also showing parts of adjacent contacting apparatuses.

In FIGURE 2, 30 represents the tray, 31 the first elongated tubular wall which defines a contacting chamber 32 having located therein a vane deck 33, 34 is the gas entry opening, 35 the liquid entry conduit and 36 represents the second elongated tubular wall which is concentrically positioned about the first tubular wall 31 to define the space 37. As shown, 38 represents the bent terminal end portion of the enveloping wall 36, by means of which the separated liquid is first caught prior to entering the space 37. The opening 39 defined by the aforementioned portion 38, permits gas to leave the apparatus. The separated liquid passes downwardly through space 37 into a drain generally denoted at 42. As can be seen, the lower extending terminal end portion 41 of the enveloping tubular wall 36 cooperates with the U-shaped member 42 to form a liquid seal. The liquid that has been separated flows over the brim of the drain 42 and falls between the various tubular contacting apparatuses onto a tray lying below. The slit 43 allows the liquid entering through conduit 35 to reach the chamber 32 when entrained by the upwardly flowing gas.

Referring now to FIGURES 3 and 4, 50 represents the tray, 51 the first elongated tubular wall which defines a contacting chamber 52 having located therein a vane deck 53, 54 is the gas entry opening, 55 the liquid entry opening and 56 represents the second elongated tubular wall which is concentrically positioned about the first tubular wall 51 to define the space 57. As further shown, 58 represents a bent terminal end portion of the enveloping wall 56, by means of which the separated liquid is first caught (as explained, supra) prior to descending into the space 57. The opening 59 defined by the aforementioned portion 58, permits gas to leave the apparatus. In this embodiment the opening 55 is formed at a location where the enveloping tubular wall 56 has been pressed or indented into contiguous relation with tubular wall 51. The liquid supplied through opening 55 reaches the contacting apparatus via the openings 60. The longitudinal section of FIGURE 3 illustrates how a plurality of the openings 60 may be provided to effect better distribution of the liquid entering the chamber 52.

In FIGURES 5 and 6, the first tubular wall 61 has been outwardly extruded or pressed, as at 62, into contiguous relation with the enveloping tubular wall 63. The local enlargements or extruded portions 62 serve to increase the cross-sectional area of the contacting chamber so that the overall capacity of the apparatus is increased.

Figure 7:
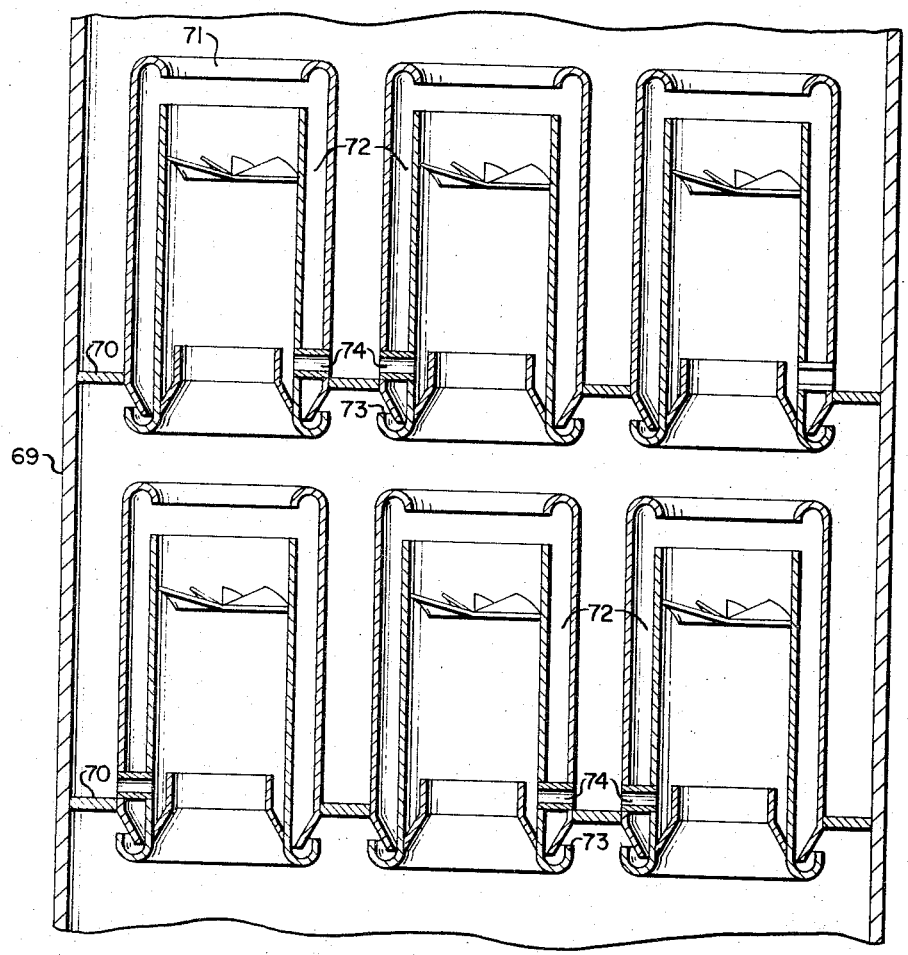
FIGURE 7 is a longitudinal section of part of a column built up of trays on which are placed a number of contacting apparatuses according to the invention.

FIGURE 7 illustrates a longitudinal section of a generally circular cylindrical column 69. Mounted at different levels throughout the height of column 69 are a plurality of horizontal trays 70. Each of the trays 70 is provided with a plurality of gas-liquid contacting devices 71. The contacting devices 71 occupy corresponding positions on each of the trays 70 so as to be in vertical alignment with each other throughout the height of the column 69. This facilitates ease of gas flow upwardly through a plurality of such contacting devices. Also, as shown, the separated liquid may flow down through the spaces 72 and drop to a lower tray 70 via a drain 73. After reaching a lower tray 70 the liquid then enters another contacting device 71 through one of the openings 74.

We claim as our invention:

1. Apparatus for effecting contact of gas and liquid comprising:
   a hollow vertical cylindrical column;
   a plurality of horizontal trays mounted at vertically spaced locations within said column;
   a plurality of openings in each of said trays, each opening in vertical alignment with corresponding openings in vertically adjacent trays;
   an apparatus for contacting gas and liquid in each of said openings, said apparatus comprising:
   a first elongated tube having a lower end terminating below said respective tray and an upper end terminating in close spatial proximity with the lower end of the vertically aligned contacting apparatus next above said first tube, said first tube upper end having a restricted discharge area;

a second elongated tube having an upper end and a lower end coaxially disposed internally of said first tube, said second tube lower end terminating at least as low as said respective tray and said second tube upper end terminating in close spatial proximity below said restricted discharge area and with greater areal opening than said restricted discharge area;

a third elongated gas conduit tube having an upper end and a lower end coaxially disposed internally of said second tube, said third tube lower end extending at least as low as said respective tray and said upper end terminating a short distance above said respective tray, the bore of said third tube in open coaxial alignment with said restricted discharge area;

contacting chamber means defined by said second tube between said second and third tube upper ends for contacting gas with liquid;

vane means mounted in said chamber means intermediate said ends for inducing a whirling motion in the fluid passing through said chamber means;

seal means between said second tube and at least the lower end of said third tube for preventing gas flow from the space encompassed by said third tube into the space between said second and third tubes;

vessel means formed between said second and third tubes above said seal means, said vessel means having aperture means for fluidly communicating said vessel means with said contacting chamber means;

fluid conduit means communicating the space surrounding said first tube above said respective tray with said vessel means for flowing fluid from said space to said vessel means;

said first and second elongated tubes defining an annular space therebetween;

annular trough means disposed generally below and spaced apart from said first tube, said annular trough means extending from and being in fluid sealing relationship with the lower end of said second tube, said annular trough means having an outer annular lip above, concentric with and of a larger diameter than said first tube lower end, said first tube lower end terminating in said trough below said outer annular lip level whereby said annular space is in fluid communication with the space below said respective tray via a fluid route under said first tube lower end and over said outer annular lip.

2. Apparatus as described in claim 1 wherein said second tube lower end is sealingly secured to said trough.

3. Apparatus as described by claim 2 wherein said second tube is sealingly secured to said trough below said outer annular lip level, thereby dividing said trough into outer and inner annular trough sections, said inner trough section having a horizontally disposed inner annular lip, said third tube lower end terminating in said inner annular trough section below said inner annular lip level, thereby constituting a fluid seal means between said third tube bore and said vessel means whereby fluid from said vessel means communicates with said contacting chamber means via a fluid route under said third tube lower end and over said inner annular lip.

4. Apparatus as described by claim 2 wherein said third tube lower end is integral with said trough and said seal means is a structural engagement of said third tube by said second tube lower end.

5. Apparatus as described by claim 2 wherein said second tube lower end is integral with said trough, said second tube having radially expanded portions extending between said contacting chamber below said vane means at the upper end and said trough at the lower end, the outer surface of said expanded portions engaging the inner bore of said first tube to interrupt the continuity of said annular space, said third tube having a concentrically flush engagement with the unexpanded bore of said second tube, said third tube upper end being above said radially expanded portion lower ends and said third tube lower end being below said radially expanded portion lower ends whereby said vessel means is formed between said third tube and the inner surface of said radially expanded portions.

6. Apparatus as described by claim 2 wherein said second tube lower end is integral with said trough and said seal means is a structural engagement of said second tube by said third tube lower end.

References Cited

UNITED STATES PATENTS

| 195,852 | 10/1877 | Starck | 261—114 |
|---|---|---|---|
| 1,098,487 | 6/1914 | Doherty. | |
| 1,121,868 | 12/1914 | Riotte et al. | |
| 1,846,248 | 2/1932 | Clark. | |
| 2,087,219 | 7/1937 | Dorfan | 55—239 |
| 2,210,808 | 9/1940 | Glitsch. | |
| 2,226,128 | 12/1940 | Harmon | 55—237 X |
| 2,354,676 | 8/1944 | Fisher | 55—236 |
| 2,551,016 | 5/1951 | Kinnaird | 261—114 |
| 2,560,077 | 7/1951 | Bloomer et al. | 261—114 X |
| 2,600,710 | 6/1952 | Wade. | |
| 2,700,644 | 1/1955 | Leffer | 208—147 X |
| 2,808,897 | 10/1957 | Reinsch et al. | 55—238 |
| 2,893,713 | 7/1959 | Haltmeier. | |

FOREIGN PATENTS

| 116,702 | 3/1943 | Australia. |
|---|---|---|
| 550,465 | 12/1957 | Canada. |
| 774,788 | 9/1934 | France. |
| 1,088,765 | 10/1953 | France. |
| 1,368,015 | 9/1963 | France. |
| 382,743 | 10/1923 | Germany. |
| 24,598 | 1914 | Great Britain. |
| 476,310 | 12/1937 | Great Britain. |

HARRY B. THORNTON, *Primary Examiner.*

ROBERT F. BURNETT, *Examiner.*

D. K. DENENBERG, D. TALBERT,
*Assistant Examiners.*